No. 616,206. Patented Dec. 20, 1898.
J. L. SIMMONS.
CONVERTIBLE POWER TRANSMITTING GEAR.
(Application filed Sept. 18, 1897.)
(No Model.) 3 Sheets—Sheet 2.
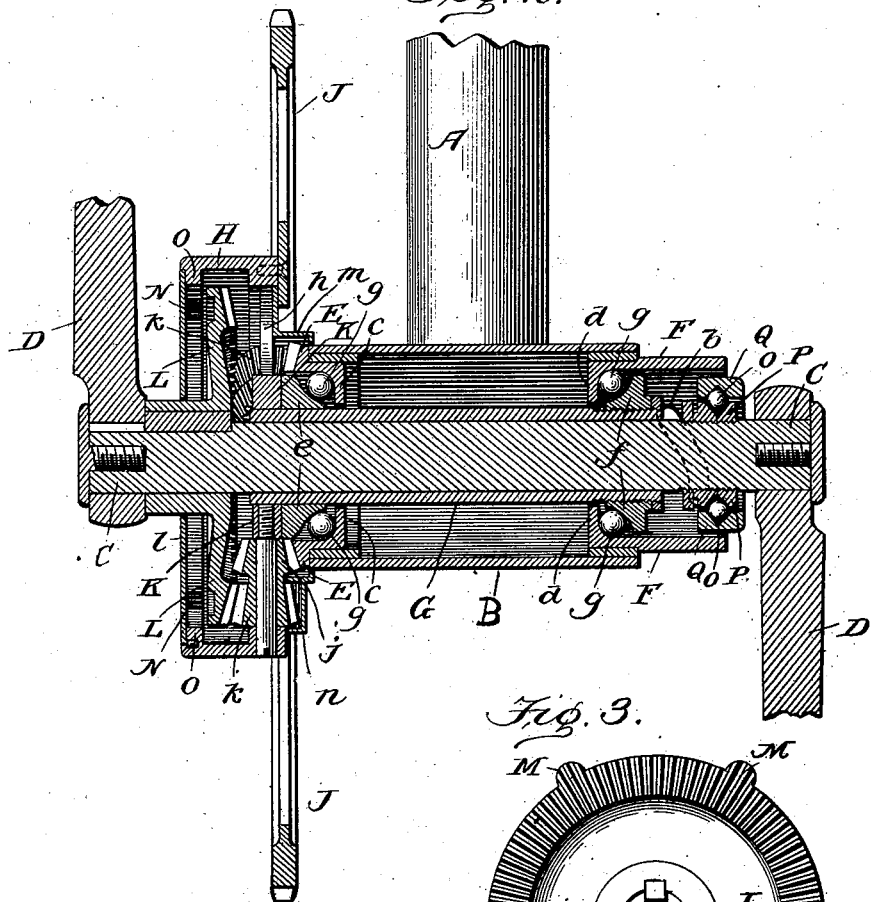
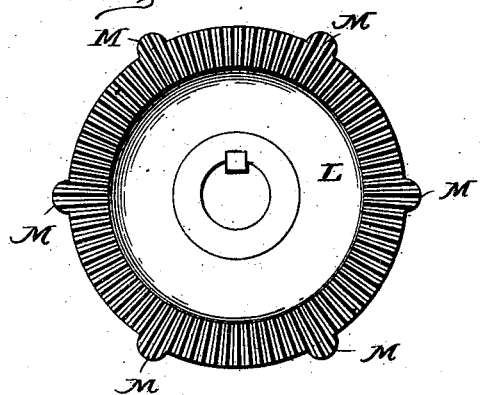
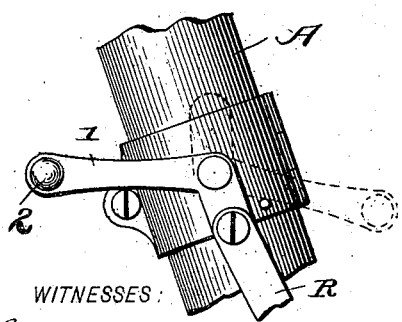
WITNESSES:
Edwin L. Bradford
R. H. McPherson Jr.
INVENTOR
James L. Simmons,
BY
Wm. E. Dyre.
ATTORNEY No. 616,206. Patented Dec. 20, 1898.
J. L. SIMMONS.
CONVERTIBLE POWER TRANSMITTING GEAR.
(Application filed Sept. 18, 1897.)
(No Model.) 3 Sheets—Sheet 3.
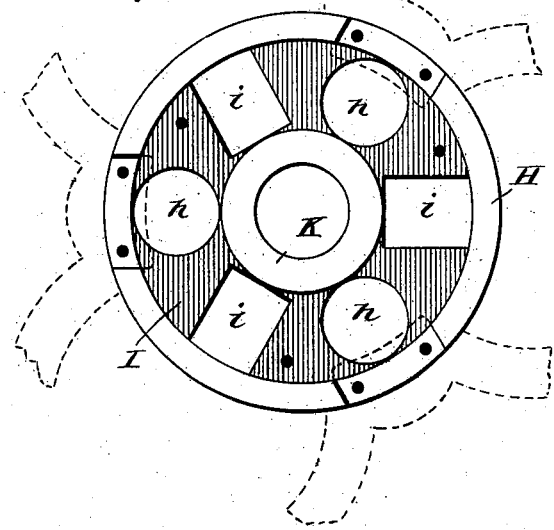
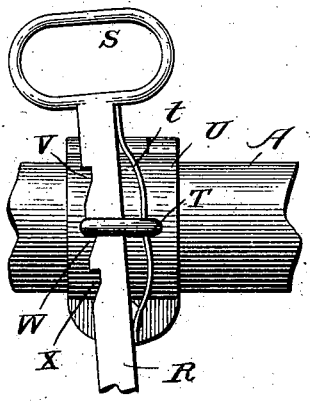
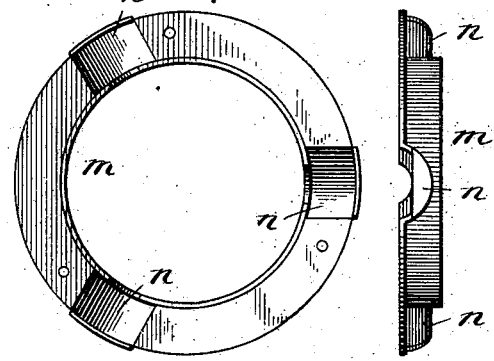
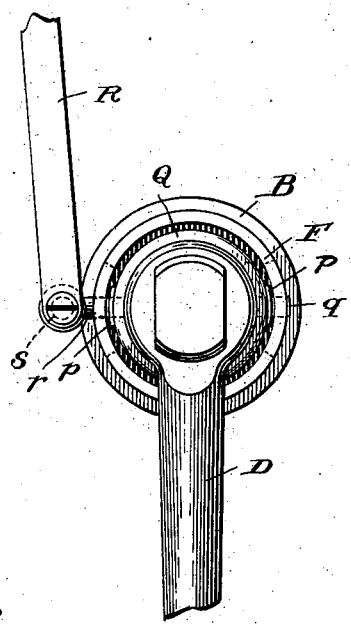
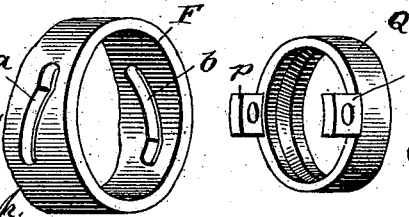
WITNESSES
Edwin L. Bradford
R. H. McPherson Jr.
INVENTOR
James L. Simmons,
BY Wm. S. Dyre.
ATTORNEY

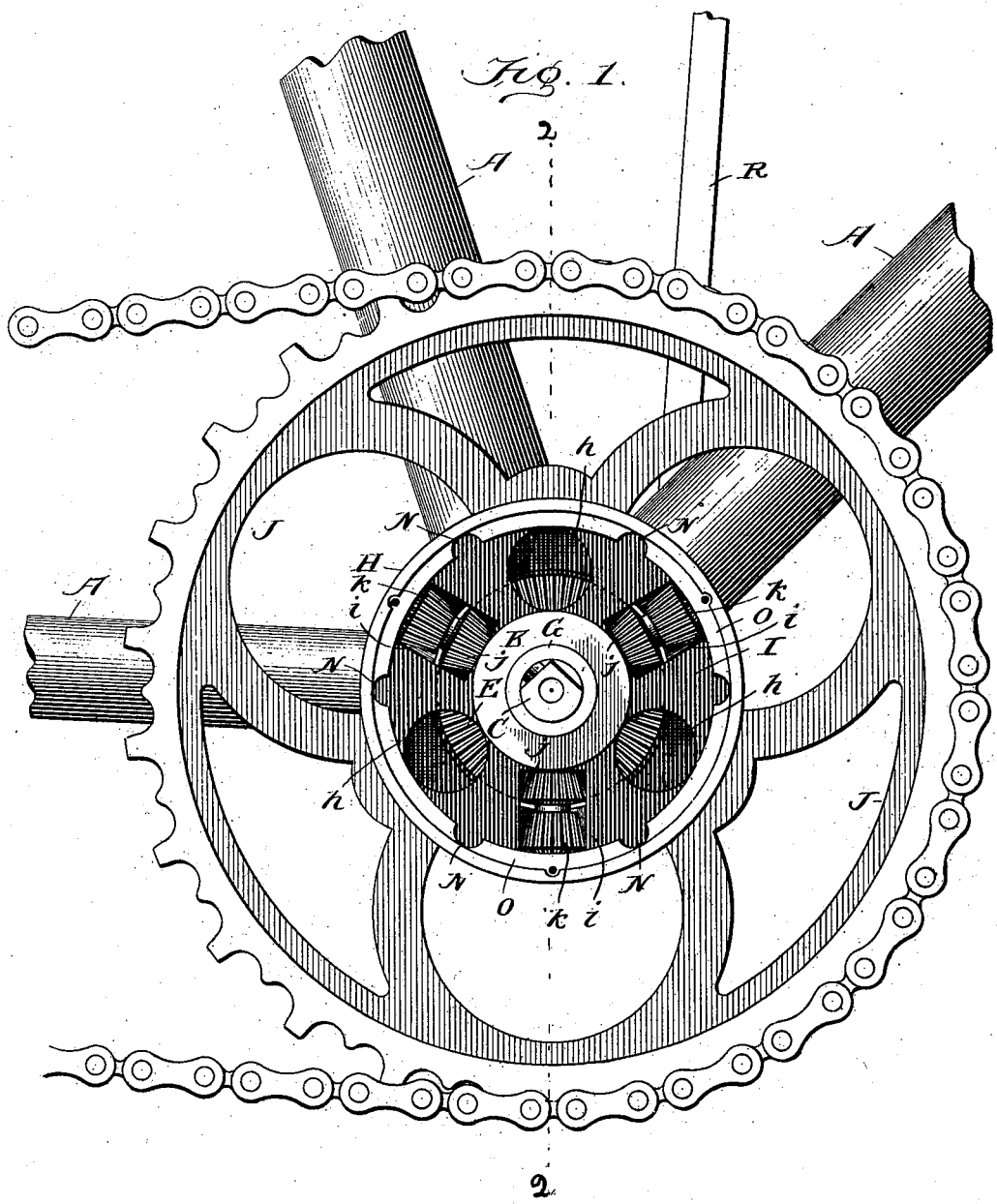

UNITED STATES PATENT OFFICE.

JAMES LEE SIMMONS, OF WASHINGTON, DISTRICT OF COLUMBIA, ASSIGNOR OF ONE-HALF TO JOSEPH R. JOHNSON, OF SAME PLACE.

CONVERTIBLE POWER-TRANSMITTING GEAR.

SPECIFICATION forming part of Letters Patent No. 616,206, dated December 20, 1898.

Application filed September 18, 1897. Serial No. 652,144. (No model.)

*To all whom it may concern:*

Be it known that I, JAMES LEE SIMMONS, a citizen of the United States, residing at Washington, in the District of Columbia, have invented certain new and useful Improvements in Convertible Power-Transmitting Gears; and I do hereby declare the following to be a full, clear, and exact description of the invention, such as will enable others skilled in the art to which it appertains to make and use the same.

My invention relates to velocipedes and horseless carriages in general, but has particular reference to that class of vehicles employing a sprocket-chain as the means of communicating power to a drive wheel or wheels, and is more especially designed for use upon the safety-bicycle.

The primary object of my present invention, therefore, is the construction of an efficient and responsive power-transmitting or differential gear applied to the frame of a bicycle or other vehicle in such manner that it may be instantly converted from high to low speed and the reverse or thrown entirely out of gear at option of the rider without the necessity of dismounting.

The invention contemplates and includes also a novel arrangement and combination of parts coöperating to produce the aforesaid results, as herein set forth, there being a crank shaft or axle, a sprocket-wheel loosely mounted upon the axle, a driving gear-wheel keyed upon said shaft, an annular rack fixed with relation to the crank-shaft, a series of bevel-gears interposed between said driving-gear and rack, and suitable means for locking the driving-gear with relation to the sprocket-wheel or causing it to intermesh with the beveled gears aforesaid.

The invention will be hereinafter described and particularly pointed out in the claims following.

In the accompanying drawings, which form part of this specification, and whereon the same letters and numerals of reference indicate corresponding parts in the several views, Figure 1 represents a side elevation of my improved gearing, an inclosing front plate and the main driving-gear being removed for the purpose of exposing parts thereunder. Fig. 2 is a central vertical section taken on the line 2 2 of Fig. 1, showing both bearings of a wheel and in addition the clutch mechanism employed for reciprocating the drive shaft or axle longitudinally. Fig. 3 is an inner or face view, in end elevation, of the driving gear-wheel keyed to the main drive-shaft. Fig. 4 is a side elevation of a case for inclosing my improved gearing, all gear-wheels being removed therefrom. Fig. 5 represents a rear elevation and a central section of an inner protecting or inclosing cap. Fig. 6 is a side elevation of a controlling-rod, partly broken away for economy of space, also the clutch mechanism with which it coacts. Figs. 7 and 8 are detail views illustrating the clutch mechanism in perspective, and Fig. 9 represents in side elevation a modified form of mechanism for operating the controlling-rod or gear-shifting mechanism.

Reference being had to the drawings and letters and numerals thereon, A indicates a bicycle-frame of ordinary construction having the usual shaft-hanger or axle-box B, drive shaft or axle C, and attached to the latter pedal-cranks D, all of well-known construction and use.

Into the open ends of box B are tightly driven annular forgings of corresponding internal dimensions, one bearing upon its flanged outer surface a fixed beveled rack E, and the other projecting, as at F, broken obliquely by oppositely-disposed slots *a b*, while each of said forgings has an inturned flange *c d*, respectively, serving as the fixed member of suitable ball-bearings, all as will hereinafter appear.

Loosely surrounding and incasing axle C is a sleeve G, having thereon adjustable members *e f* of the main ball-bearings aforesaid, between which and flanges *c d* are confined suitable antifriction-balls *g*, as shown by Fig. 2. At one end of sleeve G is a drum or gear case H, securely affixed by means of a supporting-disk I, and having bolted or otherwise attached thereto the main sprocket-wheel J, which consequently is fixed to and moves in unison with sleeve G. Disk I is perforated, as at h h h, for purposes of reducing its weight, and at i i i to receive a series of duplex pinions, each comprising inner and outer beveled gear j k, integral with each other, radially arranged upon a common center and journaled in the apertures i between hub K and the rim of case H, as most clearly shown by Fig. 1. In this relation of parts it will be observed that the inner beveled gears j are constantly in mesh with the teeth of annular rack E, around which they travel, rotating in the meantime upon their respective axes. At the case end of axle C and keyed thereto in like manner as said case H is secured to its sleeve G is a driving gear-wheel L, at all times transmitting power from axle C to sprocket-wheel J either directly or through agency of the interposed duplex gears aforesaid, according to the degree of speed and power desired. From the periphery of this driving-gear L project a series of spur-teeth M, preferably arranged in diametrically opposite pairs, as most clearly shown by Fig. 3, and adapted to interlock with corresponding depressions N, formed in a flange O of case H. (Best shown by Fig. 1.) It will thus be seen that gear L, reciprocating with the main axle C, is adapted to engage and interlock with the bevel-gears k of the duplex gears aforesaid, or depressions N of the flanged case H, or to be retained at an intermediate position in engagement with neither, for purposes that will later appear. As a means of finishing the case H and closing the ends thereof against admission of dust and foreign matter are provided front and rear covers or closures l m, the former consisting of a plain disk, through which projects the main drive shaft or axle C, and the latter comprising a surrounding cap, (best shown by Fig. 5,) having outwardly-projecting pockets n, within which rotate the duplex pinions j k. The opposite end of axle C is supported upon antifriction-balls o, contained within a ball-race, one member P whereof is adjustably secured to axle C and is surrounded by its coacting member Q, forming the other part of said race, while the ball-bearing annulus Q is itself partially inclosed by the annular forging F, projecting from box B. The annulus Q is fitted with laterally-projecting perforated lugs p p, into which are screwed pintles q r, the latter terminating in an eye s and both projecting through obliquely-arranged slots a b, respectively, in the forging F, heretofore described.

Pivotally connected with the eye s of pintle r is the lower end of a gear-controlling rod R, Fig. 6, the opposite end whereof is provided with a handhold or ring S, and is supported in a suitable staple or bracket T, secured to frame A by means of a hinged clip U. Adjacent to the clip U rod R is notched, as at V W X, said notches serving to receive one side of the bracket T, which is there normally retained by action of a leaf-spring t, interposed between the edge of rod R and the opposite side of bracket T, though obviously various other means of retaining rod R may be substituted for that herein shown and described for the purpose of shifting or changing the gear and retaining it in one of its several operative positions. For instance, the modified construction illustrated by Fig. 9 may be employed, consisting of a bell-crank lever 1, pivotally mounted upon a clip, such as U, connected to the upper end of controlling-rod R and equipped with a handle or angular knob 2, as shown, whereby upon rotation of said lever rod R may be positively elevated or depressed.

This being substantially a description of my invention in its preferred form of construction, its use and operation are as follows: Presuming that the movable parts of the invention are in their "high-gear" or normal relation, it will be noted that controlling-rod R is then in its lowermost position with bracket T resting in its uppermost notch V, axle C is projected to the right the full extent of its movement, and the spur-teeth M of driving-gear L in engagement with depressions N of the gear-case H, the main sprocket J, affixed to said case, thus being positively driven from axle C through the agency of said gear, spur-teeth, depressions, and gear-case. If now it be desired to convert the driving mechanism to a "low-gear" construction, same may be instantly effected by elevating the rod R until staple T aforesaid rests in lowermost notch X. This movement causes pintle r at lower end of the controlling-rod and its coacting pintle q to traverse the length of slots a b, obliquely arranged in opposite sides of forging F, with the effect of retracting axle C within its surrounding sleeve G. The spur-teeth M are then released from flange O of case H, the beveled teeth of driving-gear L engaging the outer gears k of the duplex pinions within said case, meshing at all times with fixed rack E. Axle C, carrying driving-gear L, then operating through the latter, causes said duplex gears to travel around the periphery of rack E while individually rotating upon their respective axes, thus constituting a form of roller-bearing and causing case H, with sprocket J, to revolve in decreased or differential time, affording a proportionate gain of power. It will be further noted that location of controlling-rod R in an intermediate position, with staple or bracket T engaging notch W, causes driving-gear L to assume an intermediate or disengaged position, as illustrated by Fig. 2, whereupon the driving mechanism is thrown out of gear, axle C remaining stationary, as for convenience in coasting.

This being substantially a description of my improvement in its preferred form of construction, it will be noted that I do not limit myself to the precise construction and arrangement of parts herein disclosed, as various modifications and changes may be made and substituted for parts herein set forth without in the least departing from the spirit of my invention, which is as follows:

I claim—

1. In a power-transmitting gear the combination with a longitudinally-movable crank-axle, of a surrounding rotatable sleeve, a sprocket-wheel carried by the latter, a series of pinions moving with the sprocket-wheel, a fixed annular rack in mesh with said pinions, a driving-gear secured upon the crank-axle, and means for shifting said axle and gear whereby the latter actuates said sprocket-wheel either directly or by engagement of the pinions aforesaid, substantially as described.

2. In a power-transmitting gear the combination with a longitudinally-movable crank-axle, of a surrounding rotatable sleeve, a gear-case carried by the latter, a sprocket-wheel secured to the gear-case, a series of pinions radially journaled in same case, a fixed annular rack in mesh with said pinions, a driving-gear secured upon the crank-axle, and means for shifting said axle and gear whereby the latter engages either the gear-case or the pinions aforesaid, substantially as described.

3. In a power-transmitting gear the combination with a longitudinally-movable crank-axle, of a surrounding rotatable sleeve, a gear-case carried by the latter, a sprocket-wheel secured to the gear-case, a series of pinions journaled in same case, a fixed annular rack in mesh with said pinions, a driving-gear secured upon the crank-axle having beveled teeth upon its face and spur-teeth upon its periphery, and means for shifting the axle and gear whereby said beveled teeth engage the pinions or said spur-teeth engage the gear-case aforesaid, substantially as described.

In testimony whereof I subscribe my signature in presence of two witnesses.

JAMES LEE SIMMONS.

Witnesses:
WM. E. DYRE,
HUGH M. STERLING.